G. F. CRIPPEN.
BEAN PICKING MACHINE.
APPLICATION FILED JULY 27, 1920.

1,413,969.

Patented Apr. 25, 1922.
3 SHEETS—SHEET 1.

Witness:
Jas E. Hutchinson

Inventor:
George F. Crippen,
By Milans & Milans
Attorneys

G. F. CRIPPEN.
BEAN PICKING MACHINE.
APPLICATION FILED JULY 27, 1920.

1,413,969.

Patented Apr. 25, 1922.
3 SHEETS—SHEET 3.

Witness:
Jas E Hutchinson

Inventor:
George F Crippen,
By
Nilaus Nilaus Attorneys

UNITED STATES PATENT OFFICE.

GEORGE F. CRIPPEN, OF MOUNT PLEASANT, MICHIGAN, ASSIGNOR TO CRIPPEN MANUFACTURING COMPANY, OF MOUNT PLEASANT, MICHIGAN, A CORPORATION OF MICHIGAN.

BEAN-PICKING MACHINE.

1,413,969.   Specification of Letters Patent.   Patented Apr. 25, 1922.

Application filed July 27, 1920. Serial No. 399,246.

*To all whom it may concern:*

Be it known that I, GEORGE F. CRIPPEN, a citizen of the United States, residing at Mount Pleasant, in the county of Isabella and State of Michigan, have invented certain new and useful Improvement in Bean-Picking Machines, of which the following is a specification, reference being had therein to the accompanying drawing.

My invention relates to new and useful improvements in bean picking machines, and has for its principal object the construction of the machine in such a manner that the speed of the picking rolls may be varied at will.

A further object resides in the provision of a novel form of hopper for feeding the beans to the picking rolls and novel means for supporting and rotating the several parts of the machine.

Another object consists in means for removing and replacing some of the driving gears whereby gears of various diameters may be used for varying the speed of the picking rolls.

With these and other objects in view my invention consists in the novel details of construction and arrangement of parts which will be more clearly understood from the following specification and drawings, and while I have illustrated the preferred embodiment of my invention, it will be understood that such changes may be made as will fall within the scope of the appended claims.

In the drawings:—

Figure 1:
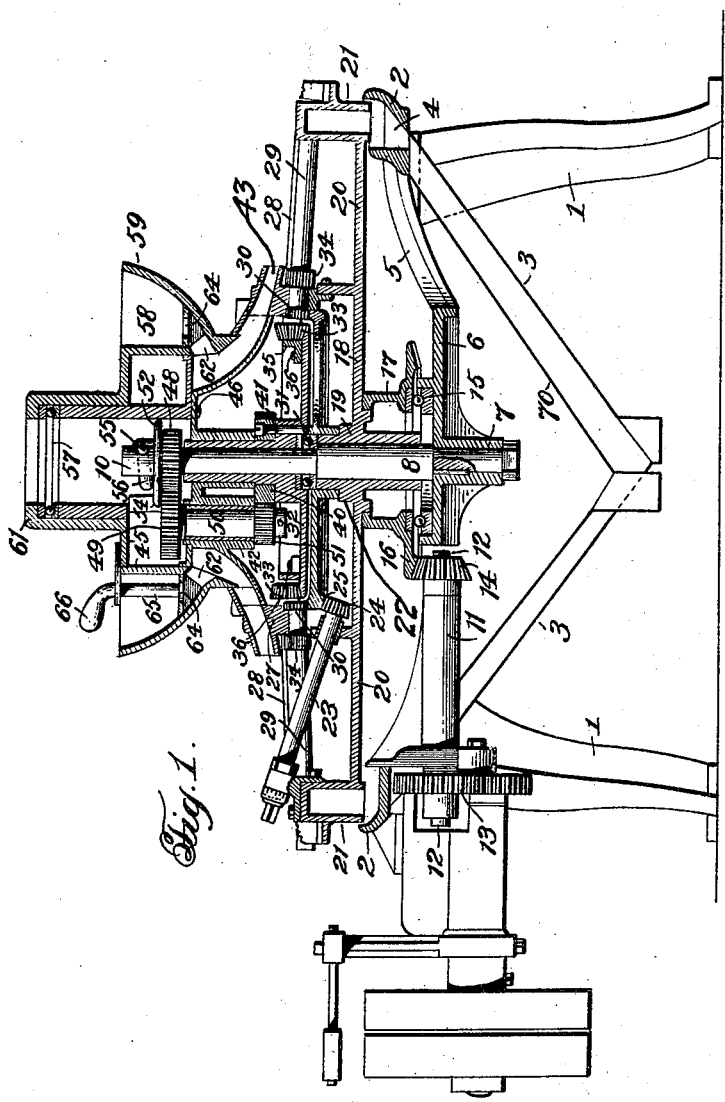
Figure 1 is a vertical central section through a machine, embodying the invention showing parts in elevation.
Figure 2:
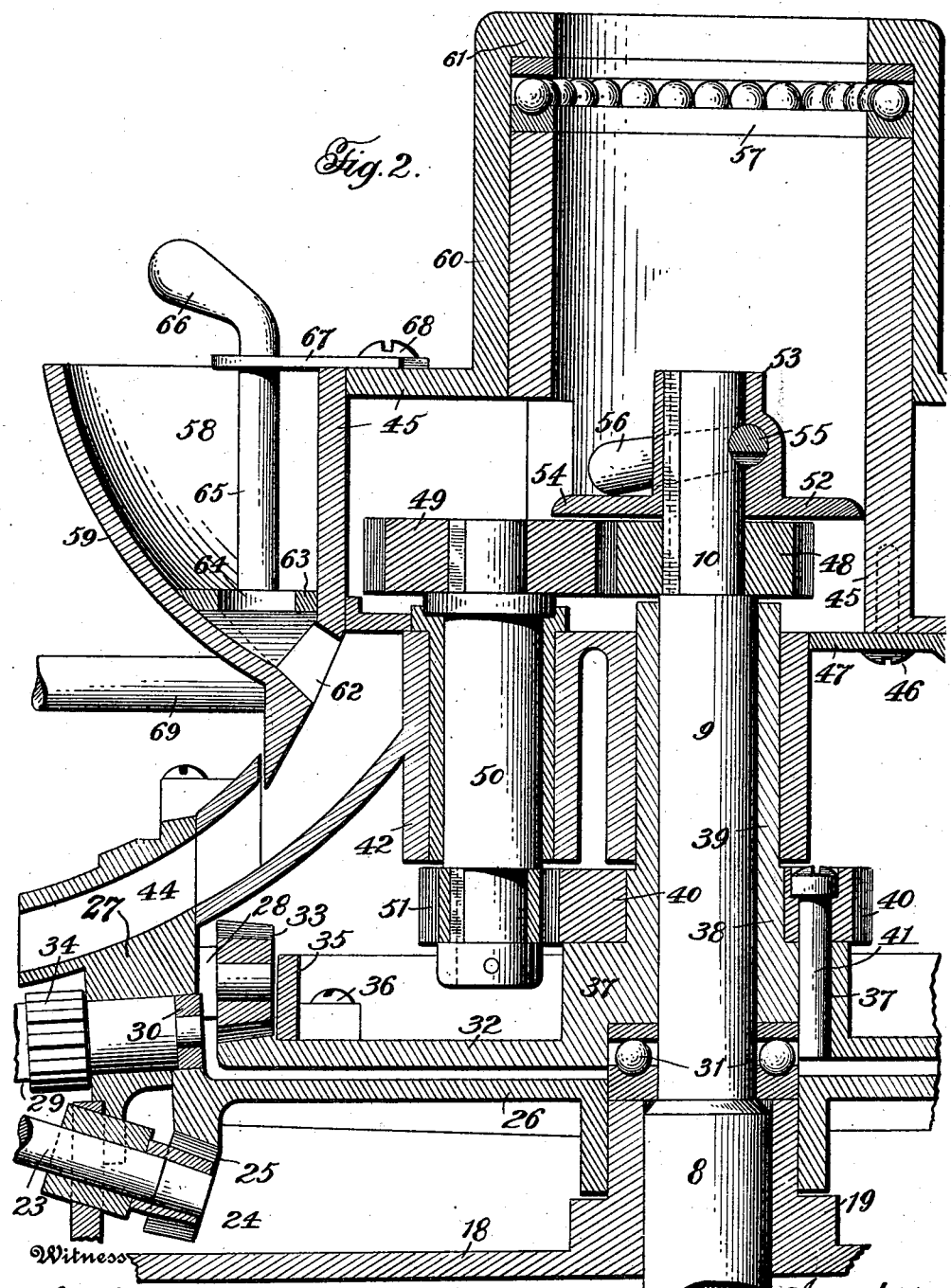
Figure 2 is an enlarged fragmentary vertical section.
Figure 3:
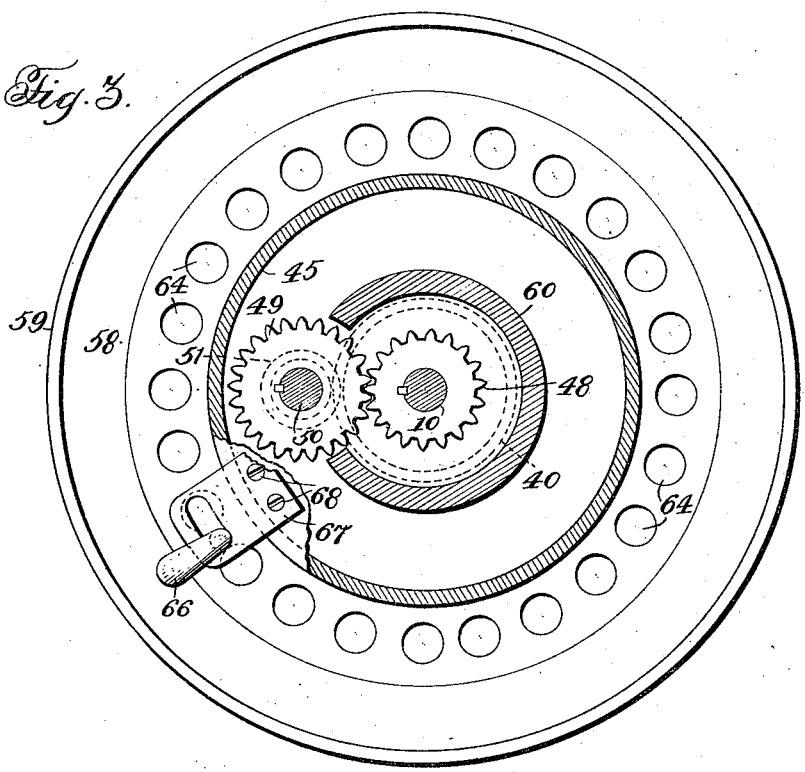
Figure 3 is a top plan, parts being shown in horizontal section.
Figure 4:
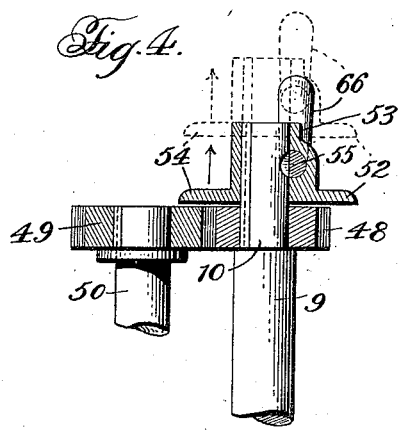
Figure 4 is a fragmental vertical section through the gear retainer and associated gears with shafts shown in elevation.
Figure 5:
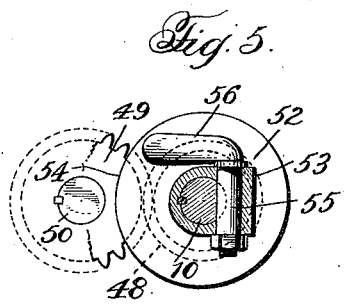
Figure 5 is a plan of the gear retainer with parts shown in horizontal section.

I have found, by experience, that by using a variable roll speed in a bean picking machine far more elastic rolls may be used, and better results obtained, than is possible in the old type of machine employing hard rolls running at fixed high speed.

In the drawings, 1 indicates supporting legs carrying at their upper ends an annular or ring part 2 of channel formation, the bottom of the channel being open and communicating with a hopper 3. The two parts of the channel or ring member 2 are united at intervals by cross webs 4. Extending inwardly from the member 2 are supporting arms 5 carrying at their inner ends a platform 6 having a centrally disposed bearing member 7. A vertically disposed shafting 8 is keyed in the bearing 7 and is properly stepped or shouldered so as to rest on the upper face of the platform 6, as clearly shown in the drawings. This shaft is carried upwardly and has reduced portions 9 and 10 for a purpose to be later described. A horizontal sleeve 11 is supported in the frame and carries a shaft 12 having on its outer end a driving gear 13 connected to any suitable source of power. A beveled pinion 14 is secured to the inner end of the shaft 12 for a purpose to be later described.

A ball race 15 is supported on the platform 6 and has rotatably mounted thereon a beveled gear 16 which meshes with and is rotated by the beveled pinion 14. The gear 16 is provided with an upwardly extending pedestal or flange 17 to which is secured the roll deck 18. This roll deck comprises a central portion having a vertically extending sleeve 19 and radiating arms 20. The outer ends of the arms 20 carry a ring-shaped channel member 21 extending over the annular or ring member 2. An upwardly extending flange 22 is formed on the upper surface of the central part of the roll deck 18, and a roll adjusting shaft 23 extends diagonally through the flange and has its outer end supported on the channel member 21. A beveled pinion 24 is secured to the inner end of the shaft 23 and meshes with teeth 25 formed on the under side of a beveled gear 26.

A casting 27 is supported on the flange 22 and has the inner ends of the picking or separating rolls 28 and 29 journaled therein. These rolls are mounted in pairs and their outer ends are journaled in suitable bearings preferably carried by the channel member 21. A gear wheel 30 is secured to the inner end of each of the rolls 28 and meshes with the beveled gear 26. When the shaft 23 is rotated it in turn will rotate the gear 26 and through the gears 30 adjust the rolls. It will be understood that the bearings for the inner ends of the roll 28 are adjustable, preferably eccentric, whereby the rolls 28 and 29 may be moved closer together or spaced farther apart at will.

A ball race 31 is supported on the shoulder formed by the reduced portion 9, of the shaft 8, and rotatably supports a beveled gear 32 which meshes with beveled pinions 33 secured to the inner ends of the rolls 28. The rolls 28 and 29 each carry a gear wheel 34, which mesh, so that as the gear 32 rotates it imparts rotary movement to the rolls 29 which, in turn, impart rotary movement to the rolls 28. The annular ring 35 is secured to the upper face of the gear 32, by bolts 36, or suitable fastening means, and this ring is used for holding the beveled gears 33 on the ends of the rolls 29.

An upwardly extending sleeve 37 is formed on the upper face of the gear 32 and is stepped to form the reduced portions 38 and 39. A gear wheel 40 is supported on the shoulder of the sleeve 37, formed by the reduced portion 38, and is secured in position by means of screws 41.

A casting 42 is rotatably mounted on the shoulder of the sleeve 37, formed by the reduced portion 39, and this casting is provided with discharge spouts 43 adapted to communicate with discharge openings 44 formed in the casting 27 and directed to discharge onto the separating rolls 28 and 29. An upstanding sleeve 45 is secured to the casting 43 by screws or other suitable fastening means 46 so as to form a rigid part of the casting. This sleeve 45 is formed on the lower end with a horizontal flange 47 extending over the upper ends of the discharge spouts 43.

A gear wheel 48 is keyed to the reduced portion 10 of the shaft 8, and meshes with a gear wheel 49 keyed to the upper end of a vertical shaft 50 which extends through and is rotatably mounted in the casting 43. A gear wheel 51 is keyed to the lower end of the shaft 50 and meshes with the gear wheel 40. A gear retainer 52 is received on the reduced portion 10 of the shaft 8, and comprises a sleeve 53 having a flange 54 formed on the lower end thereof. The flange 54 overlies the gear 48 and extends over the gear 59. In this way the gears 48 and 49 are held on their respective shafts and can be easily removed when desired. The sleeve 53 of the gear retainer and the reduced portion 10 of the shaft each have a semicircular recess cut therein to receive a semicircular pin 55 having a handle 56 formed on one end. When the handle 56 is turned down the semicircular pin 55 extends across into each of the semicircular recesses and securely holds the retainer on the shaft. When it is desired to remove the gears, the handle 56 is swung up, thereby rotating the pin 55 so that it is only in the recess of the sleeve of the retainer. When in this position the retainer and gears may be removed.

A ball race 57 is supported on the top of the sleeve 45 and a hopper 58 is hung from the ball race. This hopper comprises a bowl portion 59 and an upwardly extending sleeve 60 having an inwardly extending flange 61. The flange 61 extends over the ball race as shown. A plurality of discharge openings 62 lead from the bowl 59 and discharge into the spouts 43. A plate 63 is rotatably mounted in the bowl of the hopper and has a plurality of openings 64 therein adapted to be brought into registration with the discharge openings 62. A vertical rod 65 is secured to the plate and the upper end is curved to form a handle 66. The rod 65 extends through an elongated opening formed in a guide plate 67 secured to the bowl by means of screws 68 or other suitable fastening members. A stay rod 69 is provided for bracing the hopper. An inner hopper 70 is provided within the hopper 3 and is spaced therefrom. Each of the hoppers 3 and 70 will be provided with a discharge spout at the bottom.

Having fully described the detailed construction it is thought that the operation of the machine will be clearly understood. As the title of the invention implies, my machine is adapted and intended for picking beans and for separating imperfect seeds and foreign matter from perfect seeds. The seeds are initially placed into the bowl 59, of the hopper 58, and are fed through the openings 64, in the plate 63 and through the discharge openings 62 to the discharge spouts 43 from which they are discharged onto the rolls 28 and 29. The shaft 12 is rotated through means of the gear 13 and as the beveled pinion 14 meshes with the beveled gear 16 the roll bed is rotated. The shaft 8 is stationary and as the roll bed rotates it in turn rotates the castings 27 and 42, with discharge spouts 43 and sleeve 45. The casting 27 carries the rolls 28 and 29 with it and the casting 42 carries the shaft 50, with its associated gear wheels 49 and 51, around the stationary shaft 8. The gear wheel 48, on the upper end of the shaft 8, being stationary, rotary movement will be imparted to the gear wheel 49, shaft 50 and gear wheel 51. Gear wheel 51 meshing with gear wheel 40 rotates the beveled gear 32 which, meshing with the beveled gears 33 of the rolls 29, will rotate the rolls. The speed of the rolls may be varied by varying the size of the gear wheels 48, 49, 51, and 40, and the gears 48 and 49 may be removed and changed at will by removing the gear retainer 52 in the manner as previously described. The rolls 28 and 29 are slightly inclined, as shown in the drawings, and as the parts are operated the perfect beans will slide longitudinally of the rolls and be discharged into the hopper 3. Imperfect beans and foreign matter are drawn through the rolls and deposited into the inner hopper 70.

Having fully described my invention, what I claim as new and desire to secure by Letters Patent is:—

1. A bean picking machine comprising a rotatable bed, rolls journaled in the bed, means for rotating the bed, means for rotating the rolls, and means for varying the speed of the rolls independently of the speed of the bed.

2. A bean picking machine comprising a rotatable bed, rolls journaled in the bed; means for rotating the bed, means for rotating the rolls, means for varying the speed of the rolls independently of the speed of the bed, and means carried by the bed for discharging beans onto the rolls.

3. A bean picking machine, comprising a rotatable bed, rolls journaled in the bed, means for rotating the bed, and changeable gears for rotating and varying the speed of the rolls.

4. A bean picking machine comprising a stationary shaft, a bed rotatable around the shaft, means for rotating the bed, rolls journaled in the bed, a gear on the shaft for rotating the rolls, and means for varying the speed of the gear independently of the speed of the bed.

5. A bean picking machine comprising a stationary shaft, a bed rotatable around the shaft, means for rotating the bed, rolls journaled in the bed, a gear on the shaft for rotating the rolls, and inter-changeable gears operating the first mentioned gear for changing the speed thereof.

6. A bean picking machine comprising a stationary shaft, a bed rotatable around the shaft, means for rotating the bed, rolls journaled in the bed, gears secured to the rolls, a gear rotatable on the shaft and meshing with the gears on the rolls, and means for rotating and varying the speed of the gear on the shaft independently of the speed of the bed.

7. A bean picking machine comprising a stationary shaft, a bed rotatable on the shaft, means for rotating the bed, rolls journaled in the bed, gears secured to the rolls, a gear rotatable on the shaft and meshing with the gears on the rolls, a rotatable casting on the shaft, and gears carried by the casting for operating the gear on the shaft.

8. A bean picker comprising a stationary shaft, a bed rotatable on the shaft, means for rotating the bed, rolls journaled in the bed, gears secured to the rolls, a beveled gear rotatable on the shaft and meshing with the gears on the rolls, a gear secured to the beveled gear, a casting rotatable with the bed, a gear on the upper end of the stationary shaft, a vertical shaft extending through the casting, and gears secured to each end of the vertical shaft, the upper gear meshing with the gear on the stationary shaft, and the lower gear meshing with the gear on the beveled gear.

9. A bean picker comprising a stationary shaft, a bed rotatable on the shaft, means for rotating the bed, rolls journaled in the bed, gears secured to the rolls, a beveled gear rotatable on the shaft and meshing with the gears on the rolls, a gear secured to the beveled gear, a casting rotatable with the bed, a removable gear connected to the stationary shaft, adjacent the upper end, a vertical shaft extending through the casting, a removable gear secured to the upper end of the vertical shaft and meshing with the gear on the stationary shaft, and a gear on the lower end of the vertical shaft meshing with the gear on the beveled gear.

10. A bean picking machine comprising a stationary shaft, a bed rotatable on the shaft, means for rotating the bed, rolls journaled in the bed, gears secured to the rolls, a beveled gear rotatable on the shaft and meshing with the gears on the rolls, a gear secured to the beveled gear, a casting rotatable with the bed, a removable gear slidable on the upper end of the stationary shaft, a vertical shaft extending through the casting, a removable gear slidable on the upper end of the vertical shaft and meshing with the removable gear on the stationary shaft, a gear on the lower end of the vertical shaft meshing with the gear on the beveled gear, and means on the stationary shaft for holding the removable gears in position.

11. A bean picking machine comprising a stationary shaft, a bed rotatable on the shaft, means for rotating the bed, rolls journaled in the bed, gears secured to the rolls, a beveled gear rotatable on the shaft and meshing with the gears on the rolls, a gear secured to the beveled gear, a casting rotatable with the bed, a removable gear slidable on the upper end of the stationary shaft, a vertical shaft extending through the casting, a removable gear slidable on the upper end of the vertical shaft and meshing with the removable gear on the stationary shaft, a gear on the lower end of the vertical shaft meshing with the gear on the beveled gear, and removable means on the stationary shaft for holding the removable gears in position.

12. A bean picking machine comprising a stationary shaft, a bed rotatable on the shaft, means for rotating the bed, rolls journaled in the bed, gears secured to the rolls, a beveled gear rotatable on the shaft and meshing with the gears on the rolls, a gear secured to the beveled gear, a casting rotatable with the bed, a removable gear slidable on the upper end of the stationary shaft, a vertical shaft extending through the casting, a removable gear slidable on the upper end of the vertical shaft and meshing with the removable gear on the stationary shaft, a gear on the lower end of the vertical shaft meshing with the gear on the beveled gear, and a removable retainer carried by the stationary shaft for holding the removable gears in position, said retainer overlying the upper surfaces of the removable gears.

13. A bean picker comprising a stationary shaft, a bed rotatable around the shaft, means for rotating the bed, rolls journaled in the bed, means for rotating the rolls, a casting rotatable with the bed and having discharge spouts directed to the rolls, an upwardly extending sleeve secured to the casting, a stationary hopper hung from the sleeve, and means for feeding beans from the hopper to the discharge spouts of the casting.

14. A bean picker comprising a stationary shaft, a bed rotatable around the shaft, means for rotating the bed, rolls journaled in the bed, means for rotating the rolls, a casting rotatable with the bed and having discharge spouts directed to the rolls, an upwardly extending sleeve secured to the casting, a ball race supported on the upper end of the sleeve, a stationary hopper suspended from the ball race, and means for feeding beans from the hopper to the discharge spouts of the casting.

15. A bean picker comprising a stationary shaft, a bed rotatable around the shaft, means for rotating the bed, rolls journaled in the bed, means for rotating the rolls, a casting rotatable with the bed and having discharge spouts directed to the rolls, an upwardly extending sleeve secured to the casting, a ball race supported on the upper end of the sleeve, a stationary hopper suspended from the ball race, and adjustable means for regulating the discharge of beans from the hopper to the spouts of the casting.

16. A bean picker comprising a stationary shaft, a bed rotatable on the shaft, means for rotating the bed, rolls journaled in the bed, gears on one end of each roll, a gear rotatable on the shaft and meshing with the gears on the rolls, a ring on the gear on the shaft for retaining the gears on the rolls, and means for rotating the gear on the shaft.

In testimony whereof I hereunto affix my signature in the presence of two witnesses.

GEORGE F. CRIPPEN.

Witnesses:
JAMES E. COON,
FRANCIS H. DODDS.